United States Patent [19]

Umezu et al.

[11] Patent Number: 4,735,058

[45] Date of Patent: Apr. 5, 1988

[54] AIR CONDITIONING APPARATUS

[75] Inventors: Kenji Umezu, Ihara; Takaki Iwanaga, Fuji; Kazuhiro Moriyama, Fujinomiya, all of Japan

[73] Assignee: Kabushiki Kaisha Toshiba, Kawasaki, Japan

[21] Appl. No.: 76,225

[22] Filed: Jul. 22, 1987

[30] Foreign Application Priority Data

Jul. 25, 1986 [JP] Japan ................................ 61-174789

[51] Int. Cl.⁴ ......................... F25B 41/00; F25B 49/00
[52] U.S. Cl. .................................. 62/196.3; 62/228.4; 62/228.5; 62/230; 62/231
[58] Field of Search ................. 62/196.3, 196.1, 196.2, 62/228.4, 228.5, 230, 231, 158, 157; 417/12, 18, 22, 26, 27, 44, 280, 290

[56] References Cited

U.S. PATENT DOCUMENTS 3,585,451 6/1971 Day, III ............................ 62/230 X
3,633,073 1/1972 Day, III ............................ 62/230 X

FOREIGN PATENT DOCUMENTS 55-123941  9/1980  Japan .
 0018046  2/1983  Japan ..................................... 62/230
59-132779  7/1984  Japan .
 0142140  7/1985  Japan ................................. 62/228.4

Primary Examiner—Harry B. Tanner
Attorney, Agent, or Firm—Cushman, Darby & Cushman

[57] ABSTRACT

An air conditioning apparatus to which an operating current is supplied through a plug includes a compressor and a detector for detecting one of the temperature level of the plug and the operating current level flowing through the plug. When the detected level of the plug is above a first upper limit during a predetermined time after the start of the compressor, the output level of the compressor is reduced for decreasing one of the temperature level of the plug and the operating current level flowing through the plug below the first upper limit. When the detected level of the plug is above a second upper limit below the first upper limit after the predetermined time, the output level of the compressor is reduced for decreasing one of the temperature level of the plug and the operating current level flowing through the plug below the second upper limit.

6 Claims, 5 Drawing Sheets

AIR CONDITIONING APPARATUS

BACKGROUND OF THE INVENTION

1. Field of the Invention

This invention relates, in general, to air conditioning apparatus to which a source voltage is supplied through a plug. In particular, the invention relates to an air conditioning apparatus which is used typically in individual house.

2. Description of the Prior Art

In general, electric household appliances, e.g., refrigerators, air conditioners, and so forth, have a plug through which a source voltage is supplied to the appliances.

In an air conditioning apparatus, the cooling/heating capacity thereof is closely related to the operating current (source current) which flows through the plug. Increase of the cooling/heating capacity will cause an increase of the operating current. However, the rated current of a wall outlet is set at a prescribed value, e.g., 15 A. If an operating current greater than the prescribed value flows for an extended period, the supply of the operating current through the wall outlet and the plug is normally stopped by a circuit breaker.

To prevent the excessive operation of the breaker, the maximum value of the operating current is maintained under the prescribed value in conventional apparatus. The current flowing through the plug is detected by a sensor. When the detected current is greater than the prescribed value, the capacity of the compressor is reduced, and therefore the operating current may be reduced below the prescribed value.

In addition, an insufficient connection between the wall outlet and the plug, loose terminals at the wall outlet, or surface corrosion of the terminals of the wall outlet or the plug often occurs during the use of such apparatus. If the operating current of the apparatus increases to the prescribed value under the condition described above, excessive heat occurs in the wall outlet and the plug of the apparatus. As a result, a tracking phenomenon in which the plastic materials of the wall outlet and the plug are carbonized occurs, and eventually a short circuit is established through the carbonized material of the wall outlet and the plug.

To solve the above problem, the maximum value of the operating current may be decreased below the prescribed value, for example, to 10 A. However, if the maximum value of the operating current is limited below the prescribed value, the desired cooling/heating capacity of the apparatus may not be obtained.

SUMMARY OF THE INVENTION

It is an object of the present invention to avoid the excessive heating of a plug through which an operating current is supplied to an air conditioning apparatus.

It is another object of the present invention to supply a suitable operating current to an air conditioning apparatus in accordance with the progress of the operation without causing excessive heating of the plug.

To accomplish the above objects, the air conditioning apparatus to which an operating current is supplied through a plug includes a compressor having a variable output level for compressing refrigerant and a detecting section for detecting one of the temperature level of the plug and the operating current level flowing through the plug. The air conditioning apparatus further including a reducing section for reducing the output level of the compressor when the detected level of the plug is above a first upper limit during a predetermined time after the start of the operation of the compressor for decreasing one of the temperature level of the plug and the operating current level flowing through the plug below the first upper limit, and for reducing the output level of the compressor when the detected level is above a second upper limit below the first upper limit after the predetermined time for decreasing one of the temperature level of the plug and the operating current flowing through the plug below the second limit.

BRIEF DESCRIPTION OF THE DRAWINGS

The present invention is best understood with reference to accompanying drawings in which.

DETAILED DESCRIPTION OF THE PREFERRED EMBODIMENTS

Figure 1:
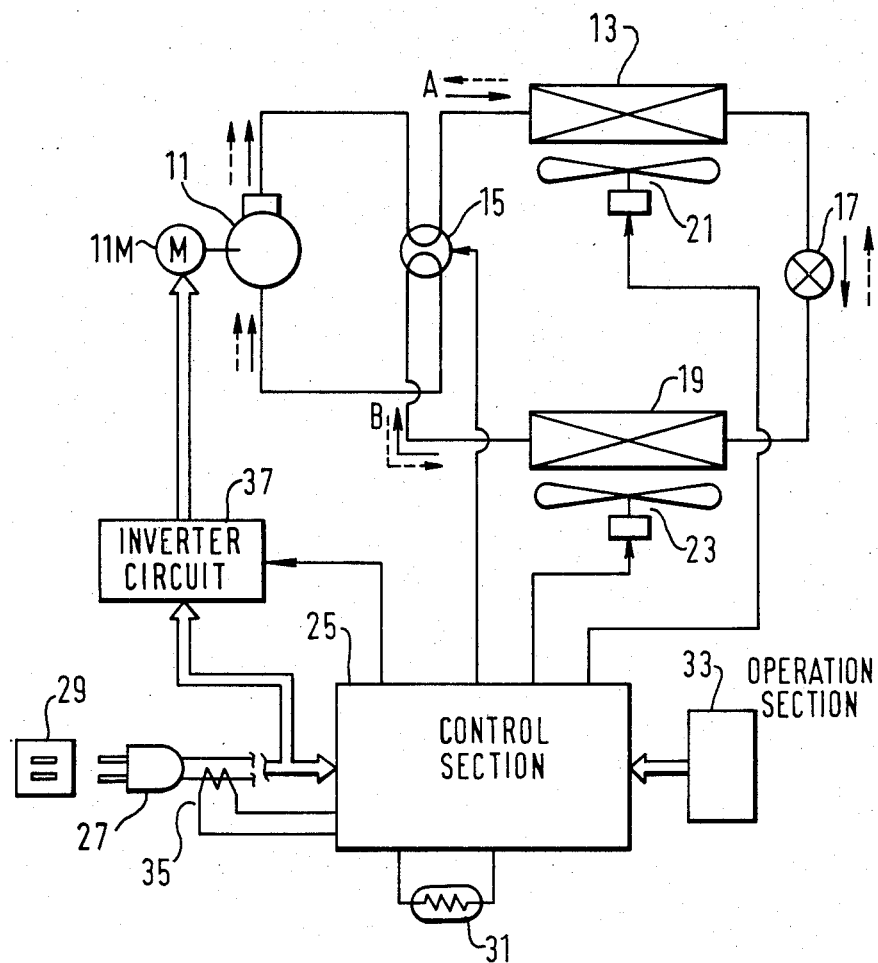
FIG. 1 is a circuit diagram of an air conditioning apparatus according to an embodiment of the present invention.

Referring to the accompanying drawings, an embodiment of the present invention will be described. However, in the drawings, the same numerals are applied to the similar elements in the drawings, and therefore the detailed descriptions thereof are not repeated.

FIG. 1 is a circuit diagram of a heat pump type air conditioning apparatus of one embodiment of the invention.

The output port of a variable capacity compressor 11 is connected to the input side of an external heat-exchanger 13 through a four-way valve 15. The output side of heat-exchanger 13 is connected to the input port of compressor 11 through an expansion valve 17, an internal heat-exchanger 19, and four-way valve 15 connected in series. An external fan 21 and an internal fan 23 are individually disposed close to the corresponding heat-exchangers 13 and 23. In the cooling operation, refrigerant in the above-described refrigerating cycle circulates through each element described above in the direction indicated by arrow A. In this operation mode, external heat-exchanger 13 serves as a condenser, and internal heat-exchanger 19 serves as an evaporator.

In the heating operation, four-way valve 15 is changed, and therefore the flow direction of refrigerant is changed, as indicated by arrow B. At this time, internal heat-exchanger 19 serves as a condenser, and external heat-exchanger 13 serves as an evaporator.

An operation control circuit will be described below. A control section 25 includes a microcomputer and its peripheral circuit. An A.C. source voltage is supplied to control section 25 through a plug 27 and a wall outlet 29. The cooling/heating operation of the apparatus is controlled by control section 25. A room temperature sensor 31 detects the temperature of the defined space in which the air conditioning apparatus is installed, and sends the detected signal to control section 25. A user may input desired air conditioning conditions, e.g., a desired room temperature, into control section 25 through an operation section 33. A current transformer 36 detects the current (operation current) I flowing through plug 27, and sends the detected current signal to control section 25. Control section 25 controls an inverter circuit 37 in accordance with the desired air conditioning conditions the detected room temperature signal, and the detected current signal. Inverter circuit 37 rectifies the A.C. source voltage supplied through plug 27, and inverts the rectified source voltage into an A.C. drive voltage having a prescribed frequency by switching operation based on a control signal from control section 25. The A.C. drive voltage is supplied to a compressor motor 11M. Thus, the cooling/heating capacity of compressor 11 is controlled by control section 25 through inverter circuit 37.

Figure 2:
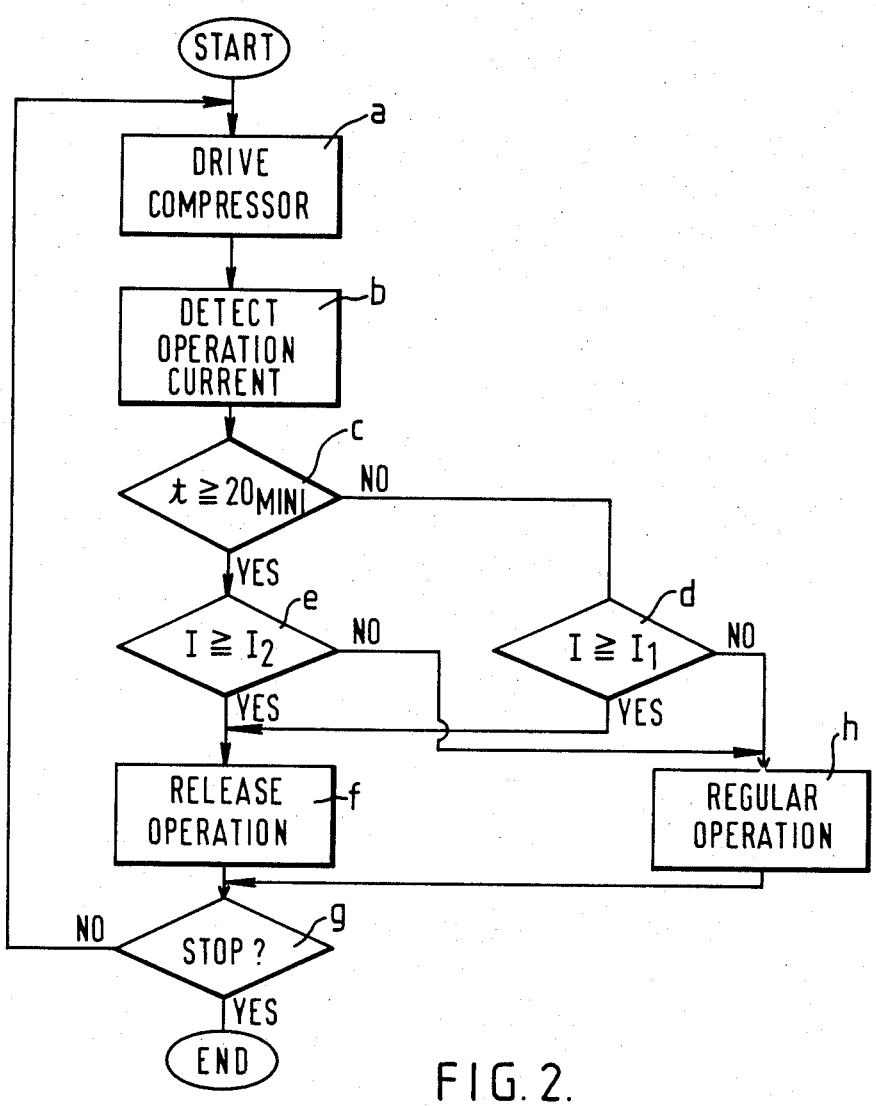
FIG. 2 is a flow-chart of the capacity control operation of the air conditioning apparatus shown in FIG. 1.
Figure 3:
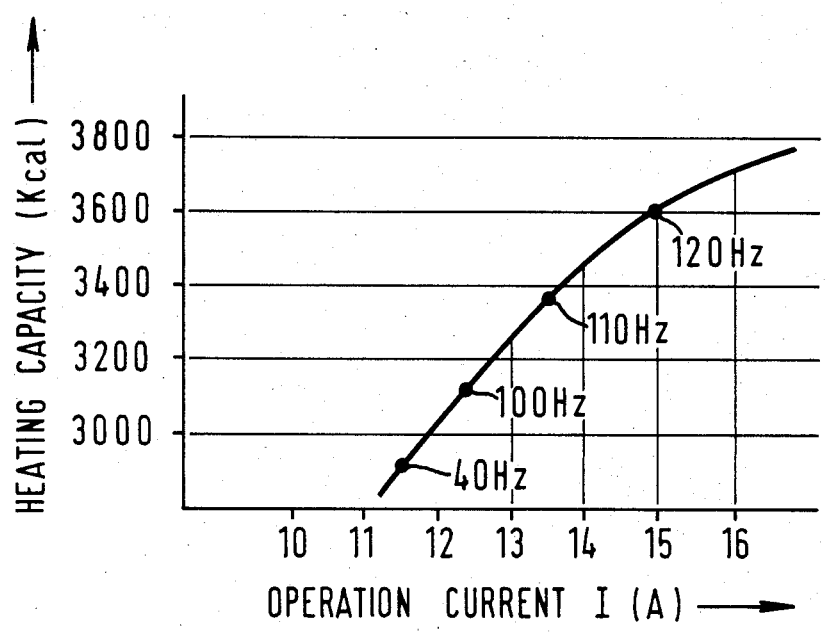
FIG. 3 is a graph showing one example of the relationship between the operating current and the heating capacity of a conventional air conditioning apparatus.

The operation of the above-described air conditioning apparatus in the heating mode will be described by referring to FIG. 2. The user sets the heating mode in operation section 33. The user also inputs a desired room temperature to control section 25 through operation section 33, and then operates the start button (not shown) of operation section 33. Control section 25 changes four-way valve 15 to the heating mode position at which refrigerant flows in the direction indicated by arrow B. Control section 25 drives external fan 21 and internal fan 23. After that, compressor 11 is driven by control section 25 through inverter circuit 37 (step a). As described above, when compressor 11 operates, refrigerant discharged from the output port of compressor 11 flows through four-way valve 15, internal heat-exchanger 19, expansion valve 17, and external heat-exchanger 13, and then is returned to the input port of compressor 11 through four-way valve 15. At this time, the microcomputer of control section 25 calculates the temperature difference between the detected room temperature and the desired room temperature. Inverter circuit 37 outputs the A.C. voltage of a prescribed frequency (hereinafter referred to as an operation frequency F) corresponding to the temperature difference fed from control section 25. Therefore, the capacity of compressor 11 is controlled to a suitable value corresponding to the air conditioning load, i.e., the difference between the detected room temperature and the desired room temperature. As can be seen in FIG. 3, there is a close relationship between the heating capacity and the operating current. If the heating capacity increases, the operating current also increases. The operating current I is detected by current transformer 35 (step b). In step c, if the operation time t from the start of the heating operation is less than a prescribed time, e.g., 20 minutes, the NO-path is taken. In step d, the detected operating current I is compared with a first prescribed value I1. In this embodiment, the first prescribed value I1 is a rated current value, e.g., 15 A. If the detected operating current I is greater than the first prescribed value, the YES-path is taken. Otherwise, the NO-path is taken. If the operation time t is more than the prescribed time in step c, the YES-path is taken. In step e, the detected operating current I is compared with a second prescribed value I2, e.g., 14 A, less than the first prescribed value. If the detected operating current I is greater than the second prescribed value, the YES-path is taken. Otherwise, the NO-path is taken. When the YES-path is taken in steps d or e, a capacity reduction control for compressor 11, referred to as a "release operation" in this field, is carried out in step f. In the capacity reduction control, the operation frequency F from inverter circuit 37 to compressor 11 is decreased by 5 Hz from the present operation frequency. In step g, if the stop command from control section 25 is absent, the NO-path is taken. Otherwise, the YES-path is taken. If the NO-path is taken in step g, the above-described steps are re-executed. At this time, if the detected operating current I is not reduced even though the capacity reduction control was carried out, the above-described steps including step f are repeatedly executed until the detected operating current I is reduced below the applicable prescribed value I2 or I1. At this time, since, in general, there are some operation delays in the breaker, the operation of the breaker does not occur rapidly even if the operating current I reaches the first prescribed value I1. If the detected operating current I falls below the applicable prescribed value I2 or I1 in steps d or e, the NO path is taken. A regular operation is carried out in step f. Inverter circuit 37 supplies compressor 11 an operation frequency F corresponding to the air conditioning load. As can be understood from the above-description, since a high heating capacity of the apparatus is required at the start of the heating operation, the operating current I rapidly increases. In this embodiment, the maximum operating current of the apparatus is allowed up to the first prescribed value I1, e.g., 15 A, for the prescribed time, e.g., 20 minutes, to achieve a sufficient heating capacity at the start of the heating operation. Therefore, the room temperature rapidly increases. Even if the operating current I is maintained close to the first prescribed value for an extended period, the capacity reduction control is executed after the prescribed time from the start of the operation. Therefore, excessive heating of the wall outlet and the plug may be avoided. That is, the prescribed time is a permissible period for avoiding such excessive heating. The prescribed time may be determined on the basis of conditions of a refrigerating cycle of individual air conditioning apparatus. In this embodiment, the maximum operating current is changed from the first prescribed value to the second prescribed value twenty minutes after from the start of the heating operation. Therefore, excessive heating of the wall outlet and the plug should be completely avoided. In this case, it is considered that the room temperature reaches a desirable level after the apparatus operates for twenty minutes from the start of the heating operation. Therefore, after that, a high heating capacity of the apparatus normally is not required. Even if the maximum operating current is changed from I1 to I2 (lower than I1), a suitable heating operation may be maintained.

Figure 4:
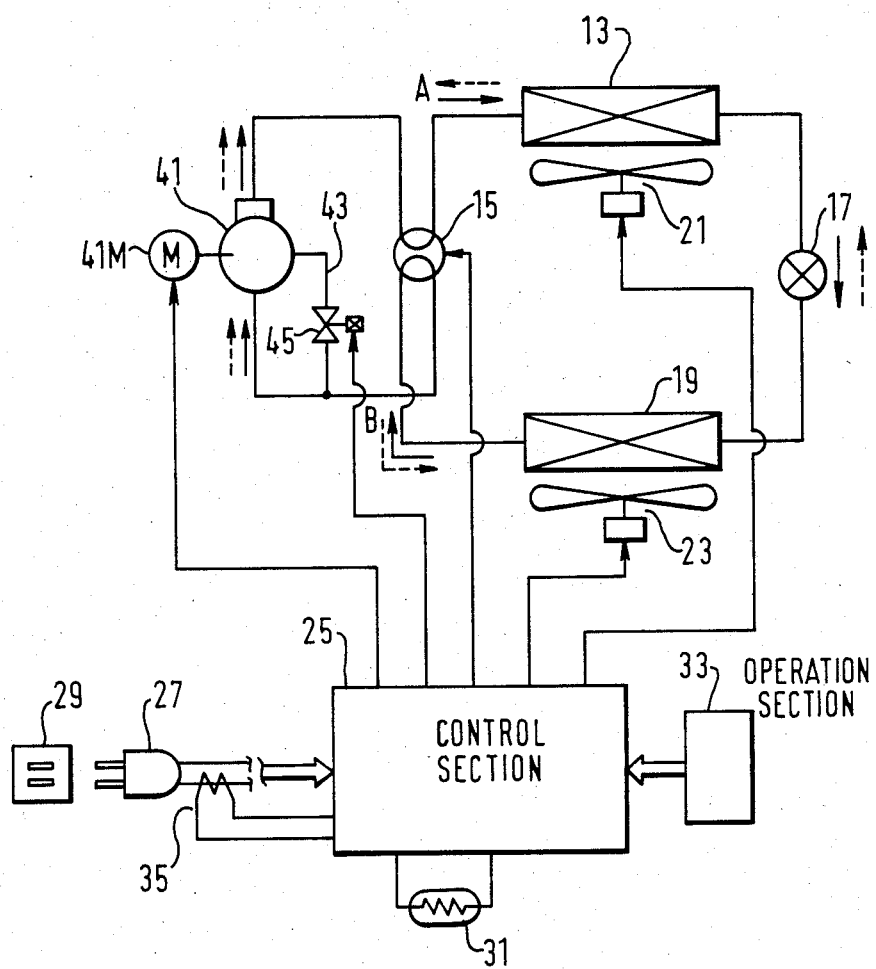
FIG. 4 is a circuit diagram showing a mechanical release control circuit of the air conditioning apparatus shown in FIG. 1.

In the above described embodiment, the maximum operating current is changed from I1 to I2 (lower than I1). However, it may continuously be changed with the elapsed time of the operation. Furthermore, in the capacity reduction control of this embodiment, a 5 Hz decrease in the operation frequency F is made, as a release control. If a fixed capacity compressor is used, refrigerant in the compressing chamber of the compressor may be directly returned to the input port side of the compressor, as shown in FIG. 4. A fixed capacity compressor 41 is employed in FIG. 4, instead of a variable capacity compressor. A release by-pass 43 is provided between the compressing chamber of compressor 41 and the input port side of compressor 41. An electromagnetic valve 45 is provided in release by-pass 43. Electromagnetic valve 45 is controlled by control section 25 in accordance with the changes of the operating current I. When the operating current I of the apparatus increases above the prescribed maximum operating current, electromagnetic valve 45 is opened, and a portion of refrigerant compressed in the compressing chamber of compressor 41 is directed to the input port side of compressor 41 through release by-pass 43. Therefore, refrigerant circulating through the refrigerating cycle may be reduced.

Figure 5:
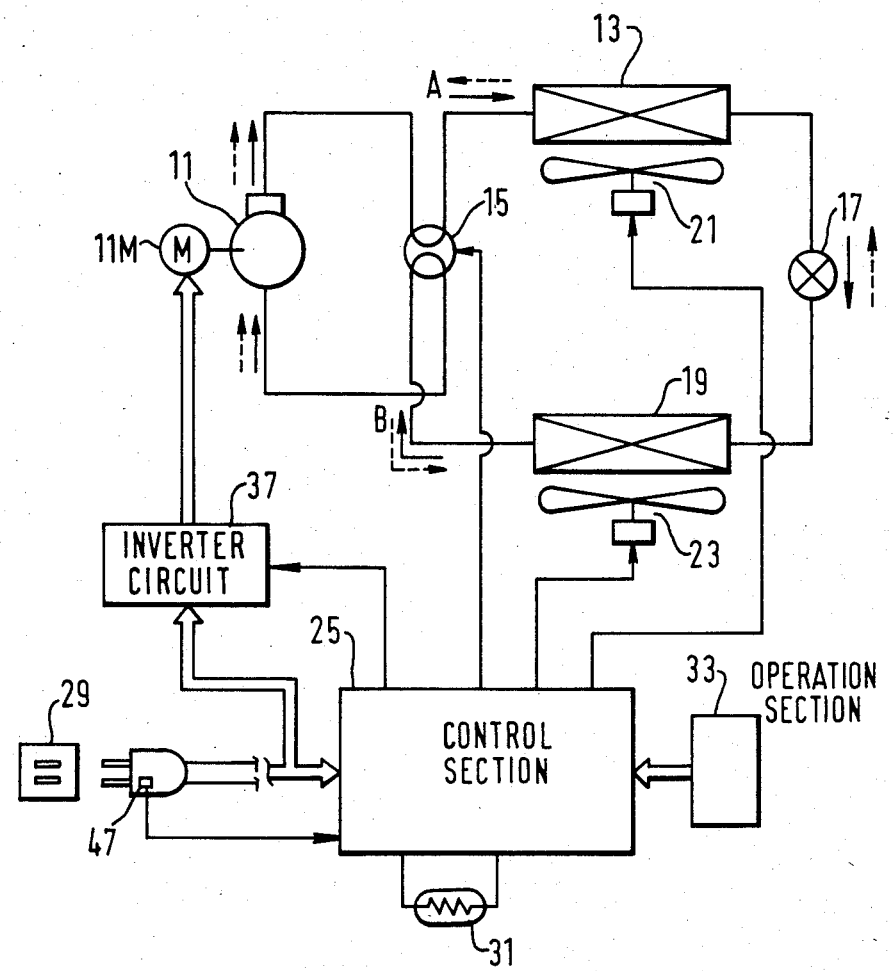
FIG. 5 is a circuit diagram of another embodiment of the present invention.

A second embodiment of the present invention will be described. FIG. 5 is a circuit diagram of second embodiment. A temperature sensor 47 is provided in plug 27 to detect the temperature Tp of plug 27. The detected plug temperature Tp is compared with a first predetermined temperature T1, e.g., 60° C., for twenty minutes from the start of the operation. The comparison temperature is changed from the first predetermined temperature T1 to a second predetermined temperature T2, e.g., 40° C., When twenty minutes from the start of the operation has elapsed. As described above, if the detected plug temperature Tp is greater than the first or second predetermined temperature T1 or T2, the capacity reduction control is carried out. The detailed operation of the capacity reduction control is the same as that of the first embodiment, described above.

With the embodiments described above, a desirable capacity of the compressor may be obtained without causing excessive heating of a plug and a wall outlet.

In the above-described embodiments, the invention discloses only the heating operation of the air conditioning apparatus. However, the invention may also be applied to the cooling operation of the apparatus.

The present invention has been described with respect to specific embodiments. However, other embodiments based on the principles of the present invention should be obvious to those of ordinary skill in the art. Such embodiments are intended to be covered by the claims.

What is claimed is:

1. An air conditioning apparatus having a plug to which an operating current is supplied, comprising:
    compressor means having a variable output level for compressing refrigerant;
    means for detecting one of the temperature level of the plug and the operating current level flowing through the plug; and
    means for reducing the output level of the compressor means when the detected level of the plug is above a first upper limit during a predetermined time after the start of the operation of the compressor means for decreasing one of the temperature level of the plug and the operating current level flowing through the plug below the first upper limit, and for reducing the output level of the compressor means when the detected level is above a second upper limit below the first upper limit after the predetermined time for decreasing one of the temperature level of the plug and the operating current level flowing through the plug below the second upper limit.

2. An apparatus according to claim 1, wherein the compressor means includes a fixed capacity compressor, and the reducing means includes means for releasing a portion of the refrigerant from the compressor for reducing the output level of the compressor.

3. An apparatus according to claim 2, wherein the fixed capacity compressor has an input port and an output port, and the releasing means includes valve means responsive to the detecting means for causing a portion of the refrigerant of the compressor to directly flow into the input port without flowing through the output port.

4. An apparatus according to claim 1, wherein the compressor means includes a variable capacity compressor operable in response to a variable frequency signal, and the reducing means includes inverter means for reducing the frequency of the variable frequency signal supplied to the compressor for reducing the output level of the compressor.

5. An apparatus according to claim 1, wherein the detecting means includes a current transformer for detecting the operating current level flowing through the plug, and the reducing means includes control means for comparing the detected current level with one of first and second predetermined maximum current level corresponding to the first and second upper limits.

6. An apparatus according to claim 1, wherein the detecting means includes a temperature detector for detecting the temperature level of the plug, and the reducing means includes control means for comparing the detected temperature level with one of first and second predetermined maximum temperature level corresponding to the first and second upper limits.

* * * * *